US008929682B2

(12) United States Patent
Wang

(10) Patent No.: US 8,929,682 B2
(45) Date of Patent: *Jan. 6, 2015

(54) CALIBRATING IMAGE SENSORS

(75) Inventor: Yu-Wei Wang, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

This patent is subject to a terminal disclaimer.

(21) Appl. No.: 13/096,847

(22) Filed: Apr. 28, 2011

(65) Prior Publication Data

US 2012/0274786 A1 Nov. 1, 2012

(51) Int. Cl.
*G06K 9/36* (2006.01)
*H04N 9/73* (2006.01)
*H04N 17/00* (2006.01)

(52) U.S. Cl.
CPC ............. *H04N 9/735* (2013.01); *H04N 17/002* (2013.01)
USPC .......................................... 382/276; 348/340

(58) Field of Classification Search
CPC ... G06T 5/50; G06T 2207/10036; G01J 3/28; G01J 3/2823; G01J 2003/2866; G01J 3/36; G01N 21/274; G01N 35/00693; G01N 21/25; G01N 29/30; G06K 9/4661; G06K 9/64; H04N 5/23212
See application file for complete search history.

(56) References Cited

U.S. PATENT DOCUMENTS

| 7,057,768 | B2 | 6/2006 | Zaklika et al. | |
| 7,127,112 | B2 * | 10/2006 | Sharma et al. | 382/232 |
| 7,146,040 | B2 | 12/2006 | Johannesson et al. | |
| 7,620,203 | B1 * | 11/2009 | Simmons et al. | 382/103 |
| 7,636,473 | B2 | 12/2009 | Imai et al. | |
| 7,688,468 | B2 | 3/2010 | Hardy | |
| 7,701,489 | B1 | 4/2010 | Christie et al. | |
| 7,796,833 | B2 * | 9/2010 | Polonskiy et al. | 382/274 |
| 7,826,685 | B2 * | 11/2010 | Riley et al. | 382/299 |
| 8,130,292 | B2 | 3/2012 | Lee | |
| 2006/0103738 | A1 | 5/2006 | Sano | |
| 2006/0290957 | A1 | 12/2006 | Kim et al. | |
| 2007/0027651 | A1 | 2/2007 | Ng et al. | |

(Continued)

FOREIGN PATENT DOCUMENTS

DE 102004027471 12/2005
WO WO-2009142641 11/2009

OTHER PUBLICATIONS

Hardeberg, J.Y. et al., "Multispectral Image Acquisition and Simulation of Illuminant Changes", (Research Paper), in Colour Imaging: Vision and Technology, L.W. MacDonald and R. Luo (Eds.), Wiley 1999.

(Continued)

*Primary Examiner* — Manav Seth
(74) *Attorney, Agent, or Firm* — Hewlett-Packard Patent Department

(57) ABSTRACT

In one implementation, an image sensor is calibrated by determining a spectral characterization for each image window of an image sensor, correlating the spectral characterization for each image window of the image sensor with a spectral property of a target illuminant, and generating a scale factor for each image window of the image sensor. The scale factor for each image window of the image sensor is generated based on the correlating.

18 Claims, 6 Drawing Sheets

(56) References Cited

U.S. PATENT DOCUMENTS

| | | |
|---|---|---|
| 2008/0278592 A1 | 11/2008 | Kuno et al. |
| 2009/0141975 A1 | 6/2009 | Li |
| 2009/0147098 A1 | 6/2009 | Li |
| 2009/0240138 A1 | 9/2009 | Yi |
| 2010/0007765 A1 | 1/2010 | Myhrvold et al. |
| 2010/0150439 A1 | 6/2010 | Lee et al. |
| 2010/0271503 A1 | 10/2010 | Safaee-Rad et al. |
| 2012/0274799 A1* | 11/2012 | Wang .......................... 348/222.1 |

OTHER PUBLICATIONS

Maik, Vivek et al. "Color Correction for Multiple Light Sources Using Profile Correction System" (Research Paper). Publication Date: Sep./Oct. 2009; vol. 53.

Final Office Action issued for related U.S. Appl. No. 13/096,837; issued May 9, 2014.

Advisory Action issued for related U.S. Appl. No. 13/096,837; issued Aug. 1, 2014.

* cited by examiner

|   | 1 | 2 | 3 | 4 | ... | L-1 | L |
|---|---|---|---|---|-----|-----|---|
| 1 | 1:1 | 1:2 | 1:3 | 1:4 |  | 1:L-1 | 1:L |
| 2 | 2:1 | 2:2 | 2:3 | 2:4 |  | 2:L-1 | 2:L |
| 3 | 3:1 | 3:2 | 3:3 | 3:4 |  | 3:L-1 | 3:L |
| 4 | 4:1 | 4:2 | 4:3 | 4:4 |  | 4:L-1 | 4:L |
| . |  |  |  |  |  |  |  |
| . |  |  |  |  |  |  |  |
| K | K:1 | K:2 | K:3 | K:4 |  | K:L-1 | K:L |

FIG. 1A

|   | 1 | 2 | 3 | 4 | ... | L-1 | L |
|---|---|---|---|---|-----|-----|---|
| 1 | GR | R | GR | R |  | GR | R |
| 2 | B | GB | B | GB |  | B | GB |
| 3 | GR | R | GR | R |  | GR | R |
| 4 | B | GB | B | GB |  | B | GB |
| . |  |  |  |  |  |  |  |
| . |  |  |  |  |  |  |  |
| K | B | GB | B | GB |  | B | GB |

| | 1 | 2 | 3 | ... | L/2-1 | L/2 |
|---|---|---|---|---|---|---|
| 1 | 1:1 | 1:3 | 1:5 | | 1:L-3 | 1:L-1 |
| 2 | 3:1 | 3:3 | 3:5 | | 3:L-3 | 3:L-1 |
| 3 | 5:1 | 5:3 | 5:5 | | 5:L-3 | 5:L-1 |
| ... | | | | | | |
| K/2 | K-1:1 | K-1:3 | K-1:5 | | K-1:L-3 | K-1:L-1 |

FIG. 1F — 100R

| | 1 | 2 | 3 | ... | L/2-1 | L/2 |
|---|---|---|---|---|---|---|
| 1 | 1:2 | 1:4 | 1:6 | | 1:L-2 | 1:L |
| 2 | 3:2 | 3:4 | 3:6 | | 3:L-2 | 3:L |
| 3 | 5:2 | 5:4 | 5:6 | | 5:L-2 | 5:L |
| ... | | | | | | |
| K/2 | K-1:2 | K-1:4 | K-1:6 | | K-1:L-2 | K-1:L |

FIG. 1G — 100B

| | 1 | 2 | 3 | ... | L/2-1 | L/2 |
|---|---|---|---|---|---|---|
| 1 | 2:1 | 2:3 | 2:5 | | 2:L-3 | 2:L-1 |
| 2 | 4:1 | 4:3 | 4:5 | | 4:L-3 | 4:L-1 |
| 3 | 6:1 | 6:3 | 6:5 | | 6:L-3 | 6:L-1 |
| ... | | | | | | |
| K/2 | K:1 | K:3 | K:5 | | K:L-3 | K:L-1 |

FIG. 1H — 100GB

| | 1 | 2 | 3 | ... | L/2-1 | L/2 |
|---|---|---|---|---|---|---|
| 1 | 2:2 | 2:4 | 2:6 | | 2:L-2 | 2:L |
| 2 | 4:2 | 4:4 | 4:6 | | 4:L-2 | 4:L |
| 3 | 6:2 | 6:4 | 6:6 | | 6:L-2 | 6:L |
| ... | | | | | | |
| K/2 | K:2 | K:4 | K:6 | | K:L-2 | K:L |

CALIBRATING IMAGE SENSORS

BACKGROUND

Digital imaging devices (or imaging devices) such as digital cameras and other electronic image capture devices capture images of visual scenes (or scenes) using image sensors such as charge-coupled device ("CCD") image sensors or complementary metal-oxide semiconductor ("CMOS") image sensors that include a number of sensor elements commonly known as pixels. Each pixel collects light from the scene that is to be captured. Typically, each pixel collects optical energy (i.e., light) corresponding to a particular color (e.g., red, green, or blue) that is directed to that pixel by a lens system of the imaging device. Some imaging devices include a dedicated image sensor for each color of light that is captured by the imaging devices. Other imaging devices include a single image sensor rather than a dedicated image sensor for each captured color of light. In such imaging devices, the light that is transmitted to the image sensor is filtered so that each individual pixel collects light from a single color. This filtering is typically achieved using a two-dimensional color filter array that is overlaid on image sensor.

Many color filter arrays comprise a mosaic of color filters that are aligned with the pixels of the image sensor. One filter array is based on a Bayer pattern. When a Bayer pattern is used, filtering is provided such that every other pixel collects green light and pixels of alternating rows (or columns) collect red light and blue light respectively, in an alternating fashion with pixels that collect the green light.

Lens systems used in imaging devices typically include a number of lens elements and an IR-cut filter that acts as an optical bandpass filter. For example, a lens element can be aligned with each pixel to direct or focus optical energy (or light) to that pixel. Due to manufacturing limitations, the lens power, the IR-cut filter, and the collection angle of the lens element aligned with each pixel, the light intensity and frequency (i.e., color) collected at each pixel to vary spatially across the image sensor.

Image sensors are typically calibrated as part of the manufacturing process. For example, raw images from an image sensor are captured under simulated illuminants (i.e., light sources that accurately simulate different illuminants) during manufacturing and a correction mask is generated for each illuminant during a calibration process. The correction mask for a given illuminant is then applied to images captured under that illuminant to correct the images for variations in, for example, the spectral response of the image sensor to the emission spectra of the different illuminants.

BRIEF DESCRIPTION OF THE DRAWINGS

FIGS. 1A-1H are illustrations of an image sensor, according to an implementation.

DETAILED DESCRIPTION

Figure 2:
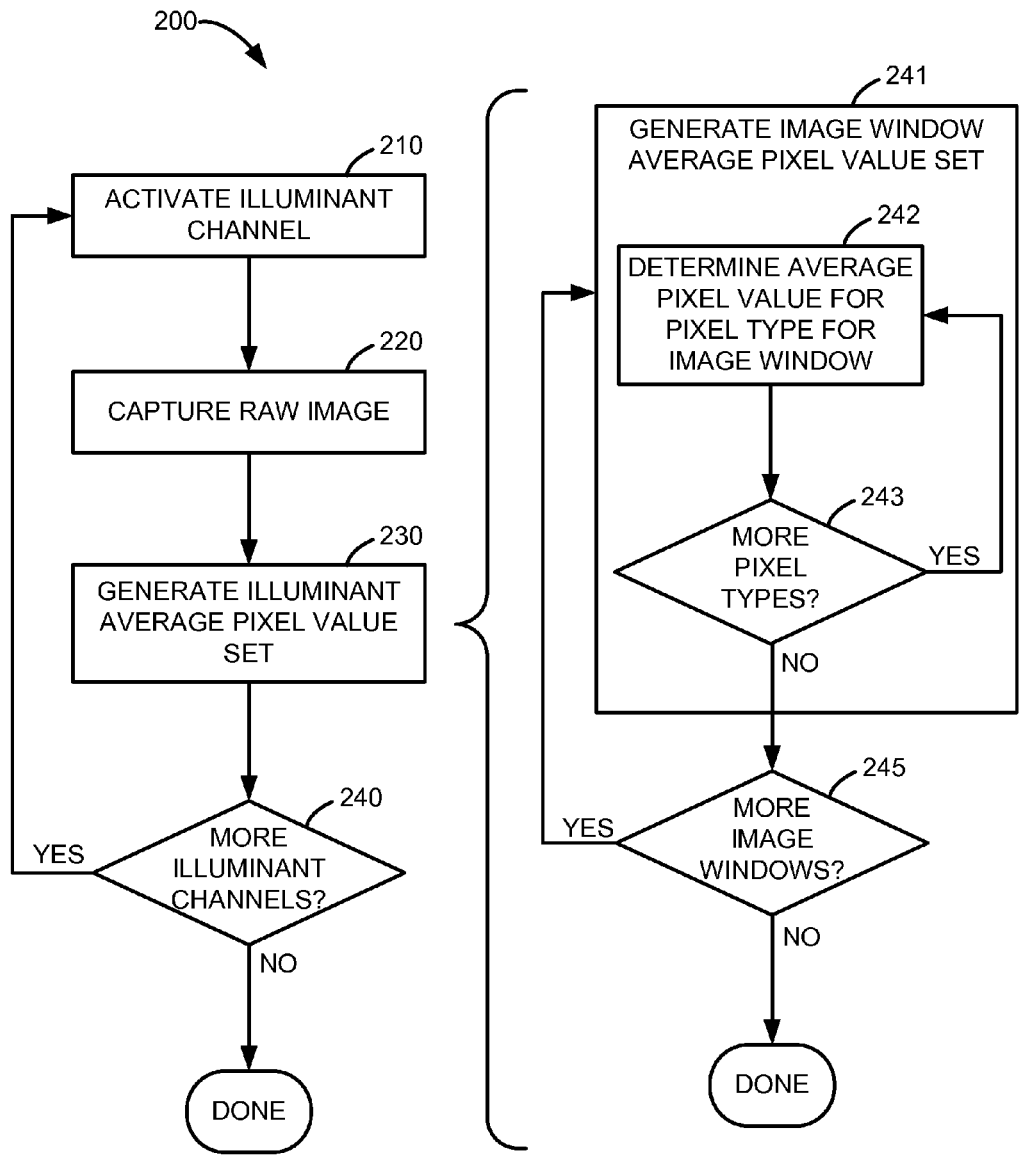
FIG. 2 is a flowchart of a process to calibrate an image sensor, according to an implementation.

Image sensors are calibrated to correct for variations in the response of the image sensors to various optical effects. For example, for a lens or lens element of an image sensor, light rays incident along the optical axis of the lens travel parallel to the optical axis. These rays typically pass through an IR-cut filter at an angle perpendicular to the surface of the IR-cut filter and are incident on the image sensor (i.e., a pixel of the image sensor) normal to the image sensor surface. Off-axis light rays are incident to the image sensor surface an angle with respect to normal of the IR-cut filter. This angle increases as the distance from the optical axis increases. In cases where the angles from the lens are large, two phenomena that result in spatial variation or distortion at the pixels of an image sensor generally occur.

The first effect is color crosstalk. Color crosstalk occurs when light destined for either a red, green, or blue pixel (i.e., a pixel for which a color filter allows red, green, or blue light, respectively, to pass) travels through that pixel or a lens element for that pixel and is collected, captured, or sensed by an adjacent pixel for a different color. Color crosstalk has the effect of reducing the amount of light collected by each pixel as well as aberrating the color information of the pixels of an image sensor.

A second effect that occurs involves the IR-cut filter used to limit the optical bandpass of the light captured by the image sensor. When incoming light rays make an angle with respect to the normal of the image sensor surface, there is a general shift of the optical bandpass cutoff wavelength towards shorter wavelengths. As the angle increases, the shift in bandpass increases. This shift towards shorter wavelengths for light rays that make an angle with respect to the normal of the image sensor surface causes a spatially varying color shift across the image sensor if it is not corrected. In addition to spatial variations across an image sensor, these effects can cause color (or chromatic) aberrations in the images and dependencies among pixels of an image sensor. That is, using an image sensor with a Bayer color filter as an example, light that should have been detected or captured at a pixel under a red filter (e.g., a red pixel or a pixel of a red pixel type) can be captured at a green pixel or a blue pixel. Thus, color dependencies can exist between the pixel of an image sensor.

Moreover, due to variations in the, for example, sensitivity of the pixels, optical properties of the lens elements, and optical properties of the filter array, the amount of optical energy captured or sensed at each pixel varies even for light rays incident normal to the surface of the image sensor. Furthermore, the lens elements, filter array, IR-cut filter, and pixels respond differently to different illuminants. In other words, the lens elements, filter array, IR-cut filter, and pixels of an image sensor have different responses (i.e., have different properties or characteristics) under different light sources or illuminants such as sunlight, fluorescent light, incandescent light, and other illuminants. Thus, images that are captured at image sensors are typically corrected or modified to accurately reproduce visual scenes under different illuminants.

One approach to correct images captured at an image sensor is to calibrate the image sensor under a variety of spatially-uniform illumination sources that simulate particular illuminants. That is, raw images (e.g., the unprocessed values accessed from each pixel of an image sensor) are captured with the image sensor under various different diffused simulated illuminants, and a correction mask is generated for that image sensor for each illuminant. The correction mask includes values that are used to modify pixel values to correct for spatial distortion and the variations in the responses of lens elements, filter array, IR-cut filter, and pixels of the image sensor. As a specific example, a correction mask can be generated by determining multiplier values for each pixel of an image sensor that will alter pixel values (i.e., measures of optical energy captured at each pixel during image capture) of those pixels to be within a predetermined threshold from an ideal or expected pixel value based on the characteristics (e.g., emission spectrum) of the simulated illuminant under which each raw image was captured.

Such correction methods, however, suffer from several disadvantages. For example, the calibration or correction mask is limited by the accuracy of the illumination sources with respect to the illuminants those illuminant sources are intended to simulate. That is, for example, the correction mask generated for a fluorescent light illuminant will poorly correct images captured under a fluorescent light if the illuminant source used to simulate fluorescent light during calibration does not have the same emission spectrum of the fluorescent light under which the images are captured.

Furthermore, the number and types of illuminants for which the image sensor is calibrated are predetermined at the time of manufacturing and, therefore, limited. In other words, each image sensor is calibrated for a relatively small number of illuminants during manufacturing. Thus, the image sensor is not calibrated for many illuminants or variations of illuminants under which images may be captured with the image sensor.

Implementations discussed herein calibrate image sensors independent of simulated illuminants (i.e., light sources that accurately simulate various illuminants). In other words, implementations discussed herein calibrate image sensors without simulated illuminant sources. For example, an image sensor can be calibrated by capturing a group of raw images under different illuminants with a known or predetermined (e.g., measured aforetime) spectral property such as an emission spectra. The raw images and the predetermined spectral property can then be used to characterize the image sensor. That is, a spectral characterization (e.g., a spectral response) of the image sensor can be defined from the raw images and the predetermined spectral property.

The spectral characterization of the image sensor is then correlated with or relative to a spectral property (e.g., an emission spectrum) of a desired or target illuminant with a known or predetermined emission spectrum. Finally, scale factors to correct for spatial variations across the image sensor relative to a reference location of the image sensor are generated. The scale factors and correlated spectral response of the image sensor can then be used to generate, for example, correction masks such as color rendering matrices and/or white balance multipliers for images captured at the image sensor under the target illuminant.

Because the spectral response of the image sensor is calculated and correlated to a target illuminant, the image sensor need not be precalibrated (e.g., during manufacturing) to that target illuminant. Rather, the image sensor can be calibrated to a target illuminant in the field or by a user based on a spectral property such as an emission spectrum of the target illuminant. Thus, the range of illuminants to which the image sensor can be calibrated need not be predetermined during manufacturing. Moreover, the calibration is not dependent on the accuracy with which an illuminant simulator reproduces or simulates a particular illuminant because the image sensor is not calibrated under illumination sources that simulate particular illuminants. Rather, the image sensor is characterized (e.g., a spectral response of the image sensor is determined) using a group of illuminants with known spectral properties (e.g., emission spectra), and the image sensor is then calibrated to particular target illuminants using known or predetermined spectral properties (e.g., emission spectra) of those target illuminants.

As used herein, the singular forms "a," "an," and "the" include plural referents unless the context clearly dictates otherwise. Thus, for example, the term "image sensor" is intended to mean one or more image sensors or a combination of image sensors. Additionally, as used herein, the term "module" refers to hardware (e.g., a processor or circuitry), software (e.g., machine- or processor-executable instructions, commands, or code such as firmware, programming, or object code) that is stored at a memory and executed or interpreted (or hosted) at a processor, or a combination thereof. In other words, a module can be hardware and/or a combination of hardware and software stored at a memory accessible to the hardware.

FIGS. 1A-1H are illustrations of an image sensor, according to an implementation. Image sensor 100 includes a number of pixels labeled 1:1-K:L in a K×L (K rows and L columns) matrix as illustrated in FIG. 1A. In other words, image sensor 100 includes a number of pixels equal to the product of K and L. In the example illustrated in FIGS. 1A-1H, image sensor 100 includes a Bayer color filter. Although FIGS. 1A-1H are discussed herein in reference to a specific implementation using a Bayer color filter, image sensors can include other color filters. For example, an image sensor can have a CMYK color filer and can have a cyan pixel type, a magenta pixel type, and a yellow pixel type. Another image sensor can have a RGBT color filter and can have a red pixel type, a green pixel type, a blue pixel type, and a teal pixel type.

FIG. 1B illustrates the pixel types of the pixels of image sensor 100. More specifically, pixels that are under (or covered by) a red color filter are labeled R and can be referred to as red pixels (that is, these pixels are of a red pixel type), pixels that are under (or covered by) a blue color filter are labeled B and can be referred to as blue pixels, pixels that are under (or covered by) a green color filter on a row with red pixels are labeled GR and can be referred to as green-red pixels, and pixels that are under (or covered by) a green color filter on a row with blue pixels are labeled GB and can be referred to as green-blue pixels.

FIGS. 1C and 1D illustrate image windows 111, 112, 113, 121, 122, 123, 131, 132, and 133. Image windows 111, 112, 113, 121, 122, 123, 131, 132, and 133 are each a group of pixels. Image windows 111, 112, 113, 121, 122, 123, 131, 132, and 133 can be referred to as image windows of image sensor 100, but need not be physical portions or parts of image sensor 100. That is, an image window can be a logical group of pixels of image sensor 100 that are used within an image processing or calibration process. Said differently, image sensor 100 or portions of image sensor 100 can be logically rather than physically partitioned into image windows 111, 112, 113, 121, 122, 123, 131, 132, and 133.

As illustrated in FIG. 1C, the image windows can include (or span) a subset of image sensor 100. That is, not every pixel of image sensor 100 is included in an image window. For example, pixels within the image window can be used as a sample set of the pixels of image sensor 100. As illustrated in FIG. 1D, the image windows can include all the pixels of image sensor 100. That is, each pixel of image sensor 100 can be included within an image window. Furthermore, image sensor 100 can be partitioned into more or fewer image windows than illustrated in FIGS. 1C and 1D.

The pixels of a common pixel type can collectively be referred to as a color plane. As a specific example, image sensor 100 with a Bayer color filter has four color planes: a red color plane including the red pixels, a blue color plane including the blue pixels, a green-red color plane including the green-red pixels, and a green-blue color plane including the green-blue pixels. Each of the color planes of image sensor can be considered a matrix that has half the rows and half the columns of image sensor 100. The color planes of image sensor 100 are illustrated logically in FIGS. 1E-1H. That is, the pixels of each pixel type are illustrated together in FIGS. 1E-1H although they are physically arranged as illustrated in FIG. 1A. FIG. 1E illustrates the green-red color plane. FIG. 1F illustrates the red color plane. FIG. 1G illustrates the blue color plane. FIG. 1H illustrates the green-blue color plane.

Raw images (e.g., arrays, matrices, or vectors of pixel values) accessed at an image sensor such as image sensor 100 with multiple pixel types. Pixels of the raw images can then be combined to define a processed image at which each pixel includes components of the pixel values from pixels of multiple pixel types of the image sensor. Combining or aggregating pixel values of multiple pixels (e.g. pixels of different pixel types) at an image sensor can be referred to as demosaicing. In other words, the pixel values of a processed image captured at image sensor 100 typically include components (or portions of) pixel values from each of the color planes.

As an example, the pixel at row 1 and column 1 of a processed image based on a raw image captured at image sensor 100 can be generated in a demosaicing process as a composite value of or a value that depends on the pixel values of pixels 1:1, 1:2, 2:1, and 2:2 of image sensor 100. That is, the pixel at row 1 and column 1 of the processed image is a composite of the pixels at row 1 and column 1 of each of the color planes illustrated in FIGS. 1E-1H. In other implementations, a demosaicing process can generate or define the value of the pixel at row 1 and column 1 of the processed image using additional or different pixels of image sensor 100.

In yet other implementations, the pixel values of a processed image include more or fewer components than the number of color planes of the image sensor at which the image was captured. In other words, a processed image can be represented in a color space that is different from a color space of a raw image. For example, the color space of image sensor 100 or raw images captured at image sensor 100 can be referred to as a red, green-red, green-blue, blue (or R-Gr-Gb-B) color space. A raw image from image sensor 100 can be transformed into a red-green-blue (or R-G-B) color space during a demosaicing process. Thus, the pixel values of the processed image produced from the raw image by the demosaicing process have three components—red, green, and blue—rather than the four components—red, green-red, green-blue, and blue—of the raw image.

Additionally, other color space transformation can be applied to raw images. For example, a raw image from image sensor 100 can be transformed to a C-M-Y-K color space (i.e., each pixel value in the processed image includes cyan, magenta, yellow, and key components) or to an R-G-B-T color space (i.e., each pixel value in the processed image includes red, green, blue, and teal components).

FIG. 2 is a flowchart of a process to calibrate an image sensor, according to an implementation. Average pixel values for each pixel type are generated for each image window of an image sensor under each illuminant channel of a multi-illuminant source by process 200. These average pixel values can be used to characterize (e.g., determine a spectral response of) the image sensor. Process 200 can be implemented as hardware, as software hosted at a computing device, and/or combination thereof.

An illuminant channel of a multi-illuminant source is activated at block 210. The multi-illuminant source is an illumination device (i.e., light source) that includes a variety of illuminant channels within the visible spectrum. For example, a multi-illuminant source can include a group of light-emitting diodes ("LEDs") that generate illuminant channels with emission spectra that range from 380 nm to 780 nm. One of the illuminant channels is activated at block 210.

Typically, the multi-illuminant source is diffused such that an image sensor illuminated by each illuminant channel of the multi-illuminant source is substantially uniformly illuminated by that illuminant channel. A raw image is then captured from an image sensor at block 220. That is, pixel values of the image sensor being calibrated are accessed from the image sensor at block 220. Pixel values represent an amount of optical energy (or light) captured or detected at each pixel.

An illuminant average pixel value set is generated from the raw image at block 230 for the illuminant channel activated at block 210. In other words, the illuminant average pixel value set is related to or associated with the current or active illuminant channel. An illuminant average pixel value set is a group of average pixel values for the active illuminant channel. For example, the illuminant average pixel value set can include an average pixel value for each pixel type of the image sensor for each of a group of image windows of the image sensor. As illustrated in blocks 241, 242, 243, and 245, an illuminant average pixel value set can be defined (or generated) by generating an image window average pixel value set at block 241 for each image window of the image sensor under the active illuminant channel.

An image window average pixel value set can be generated by determining an average pixel value for each pixel type in an image window. A pixel type of a pixel describes characteristics of the pixel. For example, an image sensor that has a filter array based on a Bayer pattern has three pixel types: red, blue, and green. These pixel types can be based on the color of light that is passed by the color filter over a given pixel. Thus, for example, an illuminant average pixel value set can include three average pixel values—one for each of red pixels (pixels of the red pixel type), blue pixels (pixels of the blue pixel type), and green pixels (pixels of the green pixel type)—for each image window of the image sensor.

In some implementations, for example as discussed above in relation to FIGS. 1A-1H, the green pixel type of an image sensor with a Bayer color filter can be divided into green-red and green-blue for green pixels in a common row (or column) with red pixels and blue pixels, respectively. As another example, in implementations with an image sensor including separate image sensors for each of red, blue, and green light, the pixels of each separate image sensor are of a common pixel type (i.e., red, blue, and green, respectively). Furthermore, image sensors can have other pixel types. For example, an image sensor can have a CMYK color filer and can have a cyan pixel type, a magenta pixel type, and a yellow pixel type. Another image sensor can have a RGBT color filter and can have a red pixel type, a green pixel type, a blue pixel type, and a teal pixel type.

As an example of generating an image window average pixel value set, the pixel values from the raw image captured at block 220 that correspond to one pixel type within an image window of the image sensor are accessed, and an average value of those pixel values is determined at block 242. This average pixel value is the average pixel value for the current pixel type and current image window. If there are more pixel types at block 243, block 242 is repeated for each pixel type within the current image window. The group or set of average pixel values for each pixel type within the current image window are the image window average pixel set.

Process 200 then proceeds to block 245. If there are more image windows at block 245, process 200 returns to block 241 to generate an image window average pixel value set for another image window. If there are no more image windows at block 245, process 200 proceeds to block 240. The group or set of image window average pixel value sets for each image window of the image sensor are the illuminant average pixel value set. In other words, the illuminant average pixel value set includes a group of average pixel values (e.g., one average pixel value per pixel type) for each image window of the image sensor under a particular illuminant.

At block 240, process 200 proceeds to block 210 to activate another illuminant channel if the multi-illuminant source includes additional illuminant channels. In other words, blocks 210, 220, and 230 are repeated for each illuminant channel to generate an illuminant average pixel value set for each illuminant channel. Said differently, average pixel values for each pixel type for each image window under each illuminant channel are generated at a calibration device implementing process 200. If there are no more illuminant channels at block 240 (i.e., average pixel values for each pixel type for each image window under each illuminant channel of the multi-illuminant source have been generated), process 200 is complete.

Process 200 can include additional or fewer blocks than those illustrated in FIG. 2. Additionally, one or more blocks can be rearranged. For example, blocks 241, 242, and 243 can be processed or executed in parallel one with another at a calibration device including a processor with multiple processing units or cores. Furthermore, although process 200 is discussed above with reference to an example environment including a calibration device, process 200 is applicable within other environments.

Figure 3:
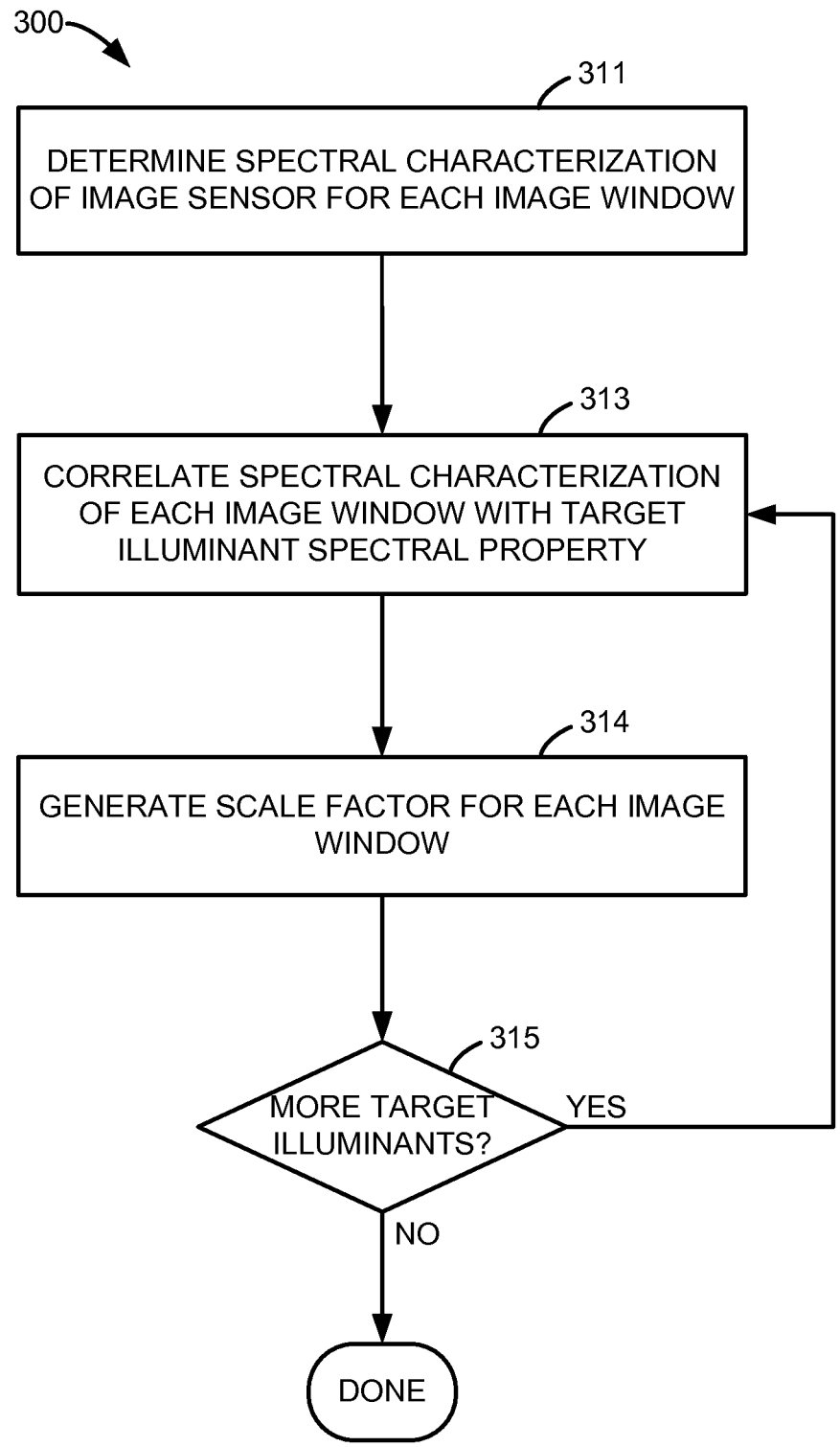
FIG. 3 is a flowchart of a process to calibrate an image sensor, according to an implementation.

FIG. 3 is a flowchart of a process to calibrate an image sensor, according to an implementation. Process 300 can be implemented as hardware, as software hosted at a computing device, and/or as a combination thereof.

A spectral characterization of each image window of an image sensor is determined at block 311. A spectral characterization describes characteristics of an image window of the image sensor with respect to optical energy of various wavelengths. For example, a spectral characterization of an image window can be a spectral response of that image window. A spectral response of each image window describes how that image window of the image sensor responds or reacts to optical energy (or light) at various wavelengths within a spectrum of wavelength (e.g., within the visible spectrum). In some implementations, the spectral characterization for each image window is different for each pixel type. That is, the spectral characterization for an image window can include a spectral characterization for each pixel type within that image window.

A spectral characterization for an image window can include, for example, a group of values for each pixel type that represent a percentage of optical energy captured at each of a group of wavelengths within the visible spectrum by that pixel type within the image window. More specifically, for example, a spectral response for an image window can include a group of values that represent an amount of optical energy captured at every fourth wavelength between 380 nm and 780 nm for each pixel type within that image window.

As a specific example of determining a spectral characterization, a group of illuminant average pixel value sets for an image sensor can be generated under various illuminant channels of a multi-illuminant source as discussed above in relation to FIG. 2. A spectral property (e.g., emission spectrum) of each illuminant channel of the multi-illuminant source can be known or predetermined and, for example, stored at a memory of an imaging device implementing process 300. Additionally, group of illuminant average pixel value sets can be stored at a memory of the imaging device during calibration of the image sensor of the imaging device during manufacturing. As a specific example, a group of illuminant average pixel value sets for the image sensor can be stored at a memory of the image sensor. That is, memory of an image sensor can be a memory of an imaging device.

A spectral characterization such as a spectral response of each image window of the image sensor can be determined by relating (i.e., defining a relationship between) the spectral property of each illuminant channel to the average pixel values for that image window from the illuminant average pixel value set for that illuminant channel. In other words, the spectral response of an image window can be determined by comparing the average amount of optical energy captured within that image window under a particular illuminant channel to the amount of optical energy output by that illuminant channel. As a specific example, the spectral response of an image window can be determined by dividing the average amount of optical energy captured within that image window under a particular illuminant channel by the amount of optical energy output by that illuminant channel for each wavelength in a group of wavelengths.

In other implementations, a spectral response of each image window of the image sensor can be determined by accessing each spectral response at a memory. For example, the spectral response of each image window of the image sensor can be generated and stored at a memory, for example, during a manufacturing process or an earlier calibration or initialization process. The spectral response of each image window of the image sensor can then be accessed at the memory at block 311. Furthermore, the spectral response of each image window of the image sensor can be stored or cached at a memory during block 311, and accessed at the memory during other blocks of process 300.

The spectral characterization of each image window is then correlated with or relative to a spectral property of a target illuminant at block 313. That is, an imaging device implementing process 300 correlates the spectral characterization of each image window to a known or predetermined spectral characterization (e.g., emission spectrum) of the target illuminant. The target illuminant is an illuminant for which the image sensor or imaging device is not yet calibrated. The spectral characterization of each image window is correlated with a spectral property of the target illuminant to generate a correlation factor or group of correlation factors. The correlation factor (or group of correlation factors) is a value or group of values that can be applied to a raw image of a visual scene captured under the target illuminant to maintain accurate color ratios in a processed image of the visual scene. In other words, the correlation factor (or group of correlation factors) is applied to the raw image to correct the raw image for the target illuminant and accurately reproduce, in the processed image, the visual scene captured under the target illuminant (e.g., such that the color ratios of the image of the visual scene are consistent or accurate with respect to color ratios of the visual scene). In some implementations, the correlation factor or correlation factors are combined with other scale factors, color ratios, color corrections, or correction masks and applied aggregately to raw images captured under the target illuminant.

As a specific example, a correlation factor can be generated for each pixel type within an image window. More specifically, for example, the spectral characterization of an image window can include a group of values that represent an amount of optical energy captured at each of a group of wavelengths for each pixel type within the image window (i.e., a spectral response of the image window). Similarly, the predetermined spectral property of the target illuminant can include a group of values that represent an amount of optical energy emitted by the target element at each wavelength from the group of wavelengths (i.e., an emission spectrum of the target illuminant). The values of the spectral characterization for each pixel type are point multiplied with the corresponding values of the spectral property of the target illuminant (i.e., the value from the spectral characterization for each wavelength is multiplied with the value from the spectral property for that wavelength), and the resulting values for each pixel type are summed to generate the correlation factor for that pixel type.

After the spectral response for each image window has been correlated with the spectral property of the target illuminant, scale factors for each image window are generated at block 314. These scale factors are values that describe a relationship between each image window and a reference image window of the image sensor. More specifically, scale factors can include ratios of spectral characterizations of image windows to the spectral characterization of a reference image window (e.g., a center image window of the image sensor). The scale factors generated at block 313 can be used to improve uniformity (e.g., color uniformity under the target illuminant) of raw images. For example, similar to correlation factors, scale factors can be applied (e.g., at an image processing module) to raw images or can be combined with color ratios, correlation factors, or correction masks and applied aggregately to raw images to correct the raw images (e.g., improve the uniformity of the raw images and/or color accuracy).

In one implementation, the scale factors are generated from the correlation factors determined at block 313. For example, the scale factors can be generated by relating (i.e., defining a relationship between) the correlation factor for each pixel type for each image window to correlation factors for a reference image window. As a specific example, a correlation factor for each pixel type for a reference image window such as a center image window of an image sensor can be divided by the correlation factor for that pixel type for each image window. The result is the scale factor for that pixel type for that image window. In other words, in this example, each image window has a number of scale factors equal to the number of pixel types of that image window.

In some implementations, each scale factor is a matrix (or scale factor matrix) that can be applied to the components of each pixel value within the image window associated with that scale factor. As discussed above, dependencies such as color dependencies exist between pixels and pixel types of image sensors. Scale factor matrices can account for or compensate for those dependencies. For example, a scale factor for an image window can be an m×n scale factor matrix that can be applied to the pixels values in that image window of an image that has processed by a demosaicing process. Furthermore, the m×n scale factor matrix (i.e., a matrix with m rows and n columns) can transform a pixel value from one color space to another color space. For example, m can be the number of components of the color space of raw images from an image sensor and n can be the number of components of the color space of processed images.

In some implementations, such scale factor matrices are generated for each image window based on correlation factors for each pixel type of that image window and relationships or dependencies among pixels (e.g., pixels of different pixel types) of an image sensor that are used to define, for example, a demosaicing process. Alternatively, for example, such scale factor matrices can be generated for each image window based on correlation factors for each pixel type of that image window and relationships or dependencies among components of a color space in which images captured at an image sensor are represented. That is, scale factor matrices can be generated to account for differences a spectral property of a target illuminant and a spectral characterization (e.g., a spectral response) of an image sensor, and to account for dependencies and/or crosstalk among pixels of an image sensor.

After scale factors are generated at block 314 for each image window, the scale factors can be stored at, for example, a memory or provided to an image processing module to process or correct raw images captured at the image sensor under the target illuminant. That is, the scale factors can be calibration values that are generated during execution of process 300 at an imaging device, and applied to raw images at an imaging processing module of that imaging device. Alternatively, for example, the scale factors can be calibration values that are generated during execution of process 300 at a calibration device, stored a memory of an image sensor or imaging device, and applied to raw images at an imaging processing module of an imaging device.

At block 315 an imaging device, for example, implementing process 300 determines whether there are additional target illuminants for which an image sensor should be calibrated. If there are additional target illuminants, process 300 returns to block 313 and blocks 313 and 314 are repeated for each target illuminant. If there are no additional target illuminants at block 315, process 300 is complete. The scale factors and/or correlation factors determined at process 300 for each target illuminant can be used, for example, to generate color rendering matrices and/or white balance multipliers, for example, that are applied to raw images captured at an image sensor under that target illuminant. In other words, the scale factors and/or correlation factors determined at process 300 for each target illuminant can be used to modify raw images captured under that illuminant (e.g., to correct the raw images for that illuminant).

Process 300 can include additional or fewer blocks than those illustrated in FIG. 3. Moreover, process 300 can be combined with other processes. For example, process 300 can be combined with process 200. That is, a calibration device can generate illuminant average pixel value sets by executing process 200 for an image sensor and then generate correlation factors and/or scale factors for one or more target illuminants for that image sensor using those illuminant average pixel value sets by executing process 300. For example, a calibration device can implement processes 200 and 300 to calibrate image sensors during a manufacturing process. The illuminant average pixel value sets, correlation factors, and/or scale factors can then be stored at a memory of the image sensor or a memory of an imaging device including the image sensor. Furthermore, although process 300 is discussed above with reference to an example environment including an imaging device, process 300 is applicable within other environments.

Figure 4:
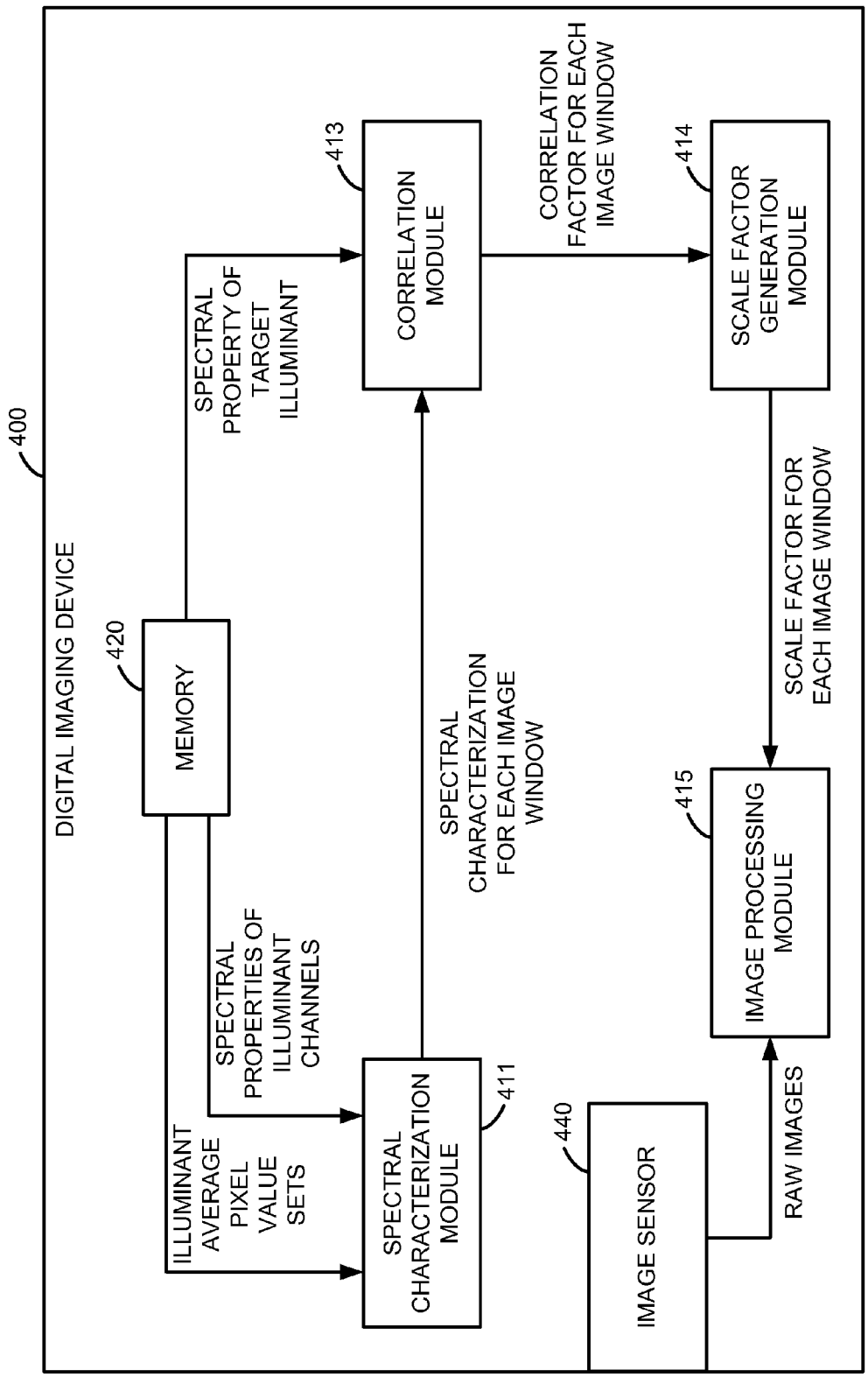
FIG. 4 is an illustration of an imaging device, according to an implementation.

FIG. 4 is an illustration of an imaging device, according to an implementation. Digital imaging device (or image device) 400 includes spectral characterization module 411, correlation module 413, scale factor generation module 414, image processing module 415, memory 420, and image sensor 440. Imaging device 400 implements a process similar to process 300 to calibrate image sensor 440.

Spectral characterization module 411 includes hardware such as a processor or application-specific integrated circuit ("ASIC"), software stored at a memory and executed from the memory at a processor, or a combination thereof to generate one or more spectral characterizations of image sensor 440. For example, spectral characterization module 411 can receive illuminant average pixel value sets for image sensor 440 from memory 420 and can receive spectral properties of illuminant channels related to those illuminant average pixel value sets. Spectral characterization module 411 generates a spectral characterization for each image window of image sensor 440 based on the illuminant average pixel value sets and the spectral properties of illuminant channels under which the illuminant average pixel value sets were generated. The spectral characterizations generated at spectral characterization module 411 are then provided to correlation module 413.

Correlation module 413 includes hardware such as a processor or ASIC, software stored at a memory and executed from the memory at a processor, or a combination thereof to correlate spectral characterizations of image sensor 440 to a spectral property of a target illuminant. As illustrated in FIG. 4, for example, correlation module 413 accesses a spectral property of a target illuminant at memory 420 and receives spectral characterizations for the image windows of image sensor 440. Correlation module 413 correlates the spectral characterization of each image window to the spectral property of the target illuminant, and outputs the results of the correlating (e.g., one or more correlation factors for each image window) to scale factor generation module 414. For example, correlation module 413 can correlate the color corrected spectral characterization of each image window to the spectral property of the target illuminant similarly to the correlation discussed above in relation to block 313 of process 300 illustrated in FIG. 3. In some implementations, correlation module 413 also outputs correlation factors (e.g., values that relate the spectral characterization of each image window to the spectral property of the target illuminant) to image processing module 415 or to memory 420.

Scale factor generation module 414 includes hardware such as a processor or ASIC, software stored at a memory and executed from the memory at a processor, or a combination thereof to generate a scale factor for each image window of image sensor 440. For example, scale factor generation module 414 can generate scale factors from correlation factors received from correlation module 413 similarly to block 314 of process 300 illustrated in FIG. 3. In some implementations, scale factor generation module 414 accesses the spectral characterization and correlation factor of each image window to generate a scale factor for that image window. For example, correlation module 413 can output or make accessible the spectral characterization for each image window to scale factor generation module 414. Scale factor generation module 414 provides the scale factor for each image window to image processing module 415. Alternatively, for example, scale factor generation module 414 provides the scale factor for each image window to memory 420, and image processing module 415 accesses the scale factors at memory 420.

Image processing module 415 includes hardware such as a processor or ASIC, software stored at a memory and executed from the memory at a processor, or a combination thereof to receive raw images from image sensor 440 and generate processed or corrected images based on those raw images. For example, image processing module 415 can apply different color corrections, correlation factors, and/or scale factors to portions of the raw images captured at various image windows of image sensor 440. In some implementations, image processing module 415 can generate or define one or more color rendering matrices and/or white balance multipliers for image sensor 440 (e.g., one or more color rendering matrices and/or white balance multipliers for each target illuminant from a group of target illuminants) based on the color corrections, correlation factors, and/or scale factors accessible to image processing module 415. Image processing module 415 can apply the color rendering matrices and/or white balance multipliers to raw images captured at image sensor 440 to modify those images to correct, for example, for spatial distortion or variation across the image or for the illuminant under which the raw image was captured.

In some implementations, some pixels of image sensor 440 are not included within an image window for which image processing module 415 includes or can access a color correction or a scale factor. Image processing module 415 can, for example, estimate a scale factor for such pixels using an interpolation such as a bilinear or bicubic interpolation based on color scale factors of other image windows (e.g., image windows in close spatial proximity to those pixels) of image sensor 440. In other words, image processing module 415 can generate or define, for example, scale factors to calibrate portions of image sensor 440 (or pixels at those portions of image sensor 440) not included in an image window based on scale factors associated with image windows of image sensor 440.

Additionally, image processing module 415 can perform other image processing on raw images. For example, image processing module 415 can demosaic, compress, or otherwise manipulate raw images captured at image sensor 440. In some implementations, one or more modules of imaging device 400 can be combined. For example, one module can perform the functions or operations discussed above in relation to multiple modules of imaging device 400. Furthermore, in some implementations, one or more modules of imaging device 400 or blocks of process 300 can be rearranged.

Figure 5:
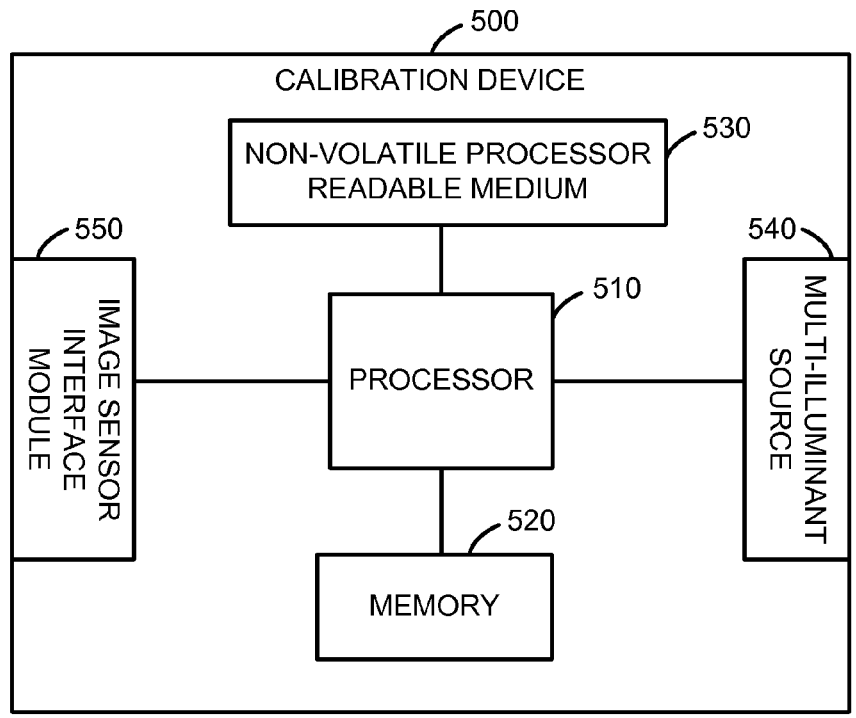
FIG. 5 is a schematic block diagram of a calibration device, according to an implementation.

FIG. 5 is a schematic block diagram of a calibration device, according to an implementation. Calibration device 500 communicates with image sensors to calibrate the image sensors (e.g., generate illuminant average pixel value sets, correlation factors, and/or scale factors), for example, as discussed above in relation to FIGS. 2 and 3. Calibration device 500 includes processor 510, memory 520, processor-readable medium 530, multi-illuminant source 540, and image sensor interface module 550.

Processor 510 is any of a variety of processors. For example, processor 510 can be a general-purpose processor or an application-specific processor and can be implemented as hardware and/or software hosted at hardware. Hardware is, for example, a microprocessor, a microcontroller, an application-specific integrated circuit ("ASIC"), a programmable logic device ("PLD") such as a field programmable gate array ("FPGA"), and/or other circuitry that performs operations. Software is, for example, processor-executable instructions, commands, codes, firmware, and/or programming stored at a memory and executed (or hosted) at a processor.

In some implementations, processor 510 can include multiple processors. For example, processor 510 can be a microprocessor including multiple processing engines (e.g., computation, algorithmic or thread cores). As another example, processor 510 can be a computing device including multiple processors with a shared clock, memory bus, input/output bus, and/or other shared resources. Furthermore, processor 510 can be a distributed processor.

Memory 520 includes data and/or instructions or codes (e.g., computer codes or object codes) defining software (or software applications) that are executed by processor 510 during operation of calibration device 500. For example, memory 520 can be a random-access memory ("RAM") that includes instructions that define an operating system, device drivers, a communications protocol stack, a database (e.g., tables of information related to spectral properties such as emission spectra of illuminant channels and/or target illuminants), and/or operational parameters such as an identifier of calibration device 500. Additionally, memory 520 can store processor-executable instructions that when executed at a processor implement a spectral characterization module, a color correction definition module, a correlation module, a scale factor generation module, and/or an image processing module.

Similarly, non-volatile processor-readable medium 530 includes data and/or codes or instructions. In some implementations, non-volatile processor-readable medium 530 data and/or processor-executable codes or instructions included at non-volatile processor-readable medium 530 are copied (or loaded) into memory 520 during a boot or initialization sequence of calibration device 500. For example, non-volatile processor-readable medium 630 can be a hard disk drive and processor 510 (or another module such as a direct memory access module or basic input/output system ("BIOS") module (not shown) of calibration device 500) can copy the data and/or processor-executable instructions included at non-volatile processor-readable medium 530 to memory 520. Processor 510 can later access those data and/or instructions during operation of calibration device 500. That is, non-volatile processor-readable medium 530 can function as a persistent or non-transient data store or memory for the codes, instructions, data value, and/or other information stored during operation of calibration device 500 at memory 520. Accordingly, memory 520 and non-volatile processor-readable medium 530 can be referred to generically as memory of computing device 500. Moreover, because non-volatile processor-readable medium 530 and memory 520 can each be accessed by processor 510, non-volatile processor-readable medium 530 and memory 520 can be referred to as processor-readable media.

Multi-illuminant source 540 is operatively coupled to processor 510 and is an illumination device (i.e., light source) that includes a variety of illuminant channels within the visible spectrum. Processor 510 can activate the illuminant channels, for example, by providing an activation signal or command to multi-illuminant source 540. As a specific example, a multi-illuminant source can include a group of light-emitting diodes ("LEDs") that individually or collectively generate illuminant channels with emission spectra that range from 380 nm to 780 nm.

Calibration device 500 communicates (e.g., exchanges signals with) image sensors via mage sensor interface module 550. For example, image sensor interface module 550 can include pins or pads that connect to or mate with contacts at an image sensor. Calibration device 500 can send and receive signals such as electrical signals via the pins of image sensor interface module 550 and the contacts at the image sensor. In some implementations, image sensor interface module 550 also implements a protocol (e.g., includes a protocol module) via which calibration device 500 communicates with image sensors. For example, image sensor interface module 550 can include a Two-Wire or Inter-Integrated Circuit™ module to communicate with image sensors via a Two-Wire or Inter-Integrated Circuit™ protocol. In some implementations, image sensor interface module 550 (or a portion thereof) is integrated at processor 510.

Calibration device 500 communicates with image sensors via image sensor interface module 550 and activates multi-illuminant source 540 to capture raw images at those image sensors. In other words, calibration device 500 communicates with image sensors via image sensor interface module 550 and activates multi-illuminant source 540 during execution of an image sensor calibration process such as process 200 discussed above in relation to FIG. 2. More specifically, for example, calibration device 500 sequentially activates a group of illuminant channels at multi-illuminant source 540 and captures a raw image from an image sensor in communication with calibration device 500 via image sensor interface module 550 for each color channel. Processor 510 can further implement other blocks of process 200 and process 300 discussed above in relation to FIGS. 2 and 3 to calibrate the image sensor. In other implementations, calibration device 500 implements one calibration process such as process 200 illustrated in FIG. 2, and another or complementary calibration process is implemented at an imaging device.

Figure 6:
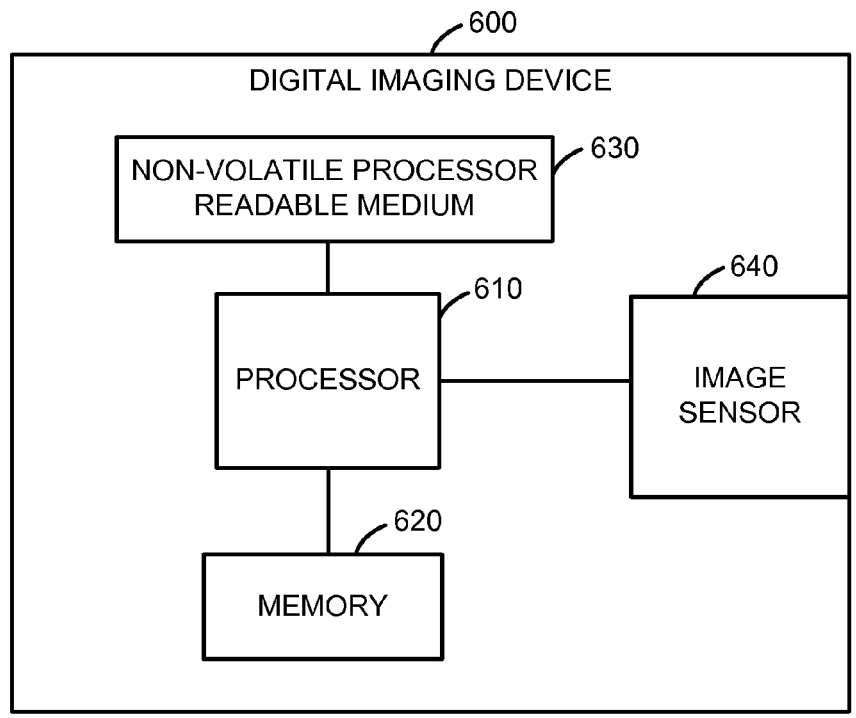
FIG. 6 is a schematic block diagram of an imaging device, according to an implementation.

As an example of an imaging device, FIG. 6 is a schematic block diagram of a digital imaging device, according to an implementation. Digital imaging device (or imaging device) 600 is a device that captures images at image sensor 640. Imaging device 600 includes processor 610, memory 620, non-volatile processor-readable medium 630, and image sensor 640. Processor 610, memory 620, and non-volatile processor-readable medium 630 are similar to processor 510, memory 520, and non-volatile processor-readable medium 530, respectively, discussed above in relation to FIG. 5.

Image sensor 640 is a device that senses or detects optical energy (e.g., light) and outputs signals related to the optical energy detected at image sensor 640. For example, image sensor 640 can be a charge-coupled device ("CCD") image sensor or a complementary metal-oxide semiconductor ("CMOS") image sensor. Typically, image sensor 640 includes a group, arranged as a matrix, of pixels. As discussed above, image sensor 640 can include dedicated image sensor for each of a group of colors or can include a color filter array overlaid on image sensor 640 to filter particular colors for each pixel. Furthermore, image sensor 640 typically includes a lens system including a lens element at each pixel to focus incoming light to that pixel.

Additionally, image sensor 640 includes an input/output interface module via which image sensor 640 is operatively coupled to processor 610. That is, image sensor 640 includes an input/output interface (e.g., contacts and/or circuitry) via which processor 610 communicates with image sensor 640. For example, processor 610 can access images or pixel values at image sensor 640 via the input/output interface. Additionally, processor 610 can access a memory within image sensor 640 that includes, for example, illuminant average pixel value sets, spectral properties of target illuminants, correlation factors, scale factors, and/or other data values or information via the input/output interface. Moreover, a calibration device can communicate with image sensor 640 via the input/output interface. For example, a calibration device can communicate with image sensor 640 via the input/output interface to calibrate image sensor 640 before image sensor 640 is installed at or coupled to imaging device 600.

In some implementations, imaging device 600 can implement a process to calibrate image sensor 640 for one or more target illuminants. For example, illuminant average pixel value sets can be stored at image sensor 640 or at another memory (i.e., memory 620 or non-volatile processor-readable memory 630) of imaging device 600 during a calibration process similar to process 200 discussed in relation to FIG. 2 during manufacturing of image sensor 640 or imaging device 600. Imaging device 600 can access the illuminant average pixel value sets to calibrate image sensor 640 to a target illuminant based on a process such as process 300 discussed above in relation to FIG. 3 hosted at processor 610. Thus, image sensor 640 can be partially calibrated at a calibration device during manufacturing and complementarily calibrated for a particular illuminant at imaging device 600. Said differently, imaging device 600 can perform additional calibration for image sensor 640 after image sensor 640 has been installed at imaging device 600.

While certain implementations have been shown and described above, various changes in form and details may be made. For example, some features that have been described in relation to one implementation and/or process can be related to other implementations. As a specific example, implementations described in relation to communications systems including numerous clients with sensors can be applicable to other environments. In other words, processes, features, components, and/or properties described in relation to one implementation can be useful in other implementations. Furthermore, it should be understood that the systems and methods described herein can include various combinations and/or sub-combinations of the components and/or features of the different implementations described. Thus, features described with reference to one or more implementations can be combined with other implementations described herein.

What is claimed is:

1. A non-transitory processor-readable medium storing code representing instructions to cause a processor to perform a process, the process comprising:
   determining a spectral characterization for each image window of an image sensor;
   correlating the spectral characterization for each image window of the image sensor with a spectral property of a target illuminant; and
   generating a scale factor for each image window of the image sensor based on the correlating.

2. The processor-readable medium of claim 1, wherein the determining a spectral characterization for each image window of the image sensor is based on a plurality of image window average pixel value sets associated with that image window of the image sensor and a predetermined spectral property for each illuminant channel from a plurality of illuminant channels.

3. The processor-readable medium of claim 1, the process further comprising:
   capturing a raw image under the target illuminant at the image sensor; and
   modifying the raw image for the target illuminant based on the scale factor for each image window of the image sensor.

4. The processor-readable medium of claim 1, the process further comprising:
   generating a color rending matrix based on the scale factor for each image window of the image sensor.

5. The processor-readable medium of claim 1, the process further comprising:
   generating a plurality of white balance multipliers based on the scale factor for each image window of the image sensor.

6. The processor-readable medium of claim 1, the process further comprising:
   repeating the correlating and the generating for each target illuminant from a plurality of target illuminants, the plurality of target illuminants including the target illuminant.

7. The processor-readable medium of claim 1, wherein scale factor for each image window of the image sensor is an mxn matrix, m is a number of components of a color space of a raw image of the image sensor, n is a number of components of a color space of a processed image.

8. An imaging device, comprising:
   an image sensor;
   a memory including a plurality of illuminant average pixel value sets; and a processor operatively coupled to the image sensor and to the memory to:
   determine a spectral characterization for each image window of the image sensor based on the plurality of illuminant average pixel value sets and a predetermined spectral property for each illuminant channel from a plurality of illuminant channels; and
   generate a scale factor for each image window of the image sensor based on the spectral characterization for that image window and a spectral property of a target illuminant.

9. The imaging device of claim 8, wherein the processor is configured to correlate the spectral characterization for each image window of the image sensor with a spectral property of the target illuminant, the scale factor for each image window of the image sensor is generated based on the correlating.

10. The imaging device of claim 8, wherein each illuminant average pixel value set from the plurality of illuminant average pixel value sets is associated with an illuminant channel from the plurality of illuminant channels and includes an image window average pixel value set for each image window of the image sensor.

11. The imaging device of claim 8, wherein the spectral characterization for each image window of the image sensor is determined based on image window average pixel value sets for that image window from the plurality of illuminant average pixel value sets and the predetermined spectral property for each illuminant channel from the plurality of illuminant channels.

12. A method comprising:
   determining a spectral characterization for each image window of an image sensor;
   correlating the spectral characterization for each image window of the image sensor with a spectral property of a target illuminant; and
   generating a scale factor for each image window of the image sensor based on the correlating.

13. The method of claim 12, wherein determining a spectral characterization for each image window of the image sensor is based on a plurality of image window average pixel value sets associated with that image window of the image sensor and a predetermined spectral property for each illuminant channel from a plurality of illuminant channels.

14. The method of claim 12, further comprising:
   capturing a raw image under the target illuminant at the image sensor; and
   modifying the raw image for the target illuminant based on the scale factor for each image window of the image sensor.

15. The method of claim 12, further comprising:
   generating a color rending matrix based on the scale factor for each image window of the image sensor.

16. The method of claim 12, further comprising:
   generating a plurality of white balance multipliers based on the scale factor for each image window of the image sensor.

17. The method of claim 12, further comprising:
   repeating the correlating and the generating for each target illuminant from a plurality of target illuminants, the plurality of target illuminants including the target illuminant.

18. The method of claim 12, wherein scale factor for each image window of the image sensor is an mxn matrix, m is a number of components of a color space of a raw image of the image sensor, n is a number of components of a color space of a processed image.

* * * * *